(12) United States Patent
Brauer et al.

(10) Patent No.: US 6,719,296 B2
(45) Date of Patent: Apr. 13, 2004

(54) SEAL FOR A ROTATING MEMBER

(75) Inventors: John Christopher Brauer, Lawrenceburg, IN (US); Christopher Charles Glynn, Hamilton, OH (US); Wu-Yang Tseng, West Chester, OH (US); Jerry Lynn Cabe, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/194,391

(22) Filed: Jul. 12, 2002

(65) Prior Publication Data

US 2004/0007823 A1 Jan. 15, 2004

(51) Int. Cl.[7] ............................................. F16J 15/447
(52) U.S. Cl. ........................ 277/413; 277/409; 277/411; 277/412; 277/421
(58) Field of Search ................................ 277/409, 411, 277/412, 413, 421, 422

(56) References Cited

U.S. PATENT DOCUMENTS

| | | | |
|---|---|---|---|
| 4,477,088 A | 10/1984 | Picard | 277/83 |
| 4,916,892 A | 4/1990 | Pope | 60/39.02 |
| 5,174,584 A * | 12/1992 | Lahrman | 277/400 |
| 5,284,347 A | 2/1994 | Pope | 277/1 |
| 5,593,165 A | 1/1997 | Murray et al. | 277/22 |
| 5,769,604 A * | 6/1998 | Gardner et al. | 415/170.1 |
| 5,975,537 A | 11/1999 | Turnquist et al. | 277/411 |
| 6,145,840 A | 11/2000 | Pope | 277/348 |
| 6,371,488 B1 * | 4/2002 | Szymborski et al. | 277/365 |

* cited by examiner

*Primary Examiner*—Anthony Knight
*Assistant Examiner*—E Peavey
(74) *Attorney, Agent, or Firm*—William Scott Andes; Pierce Atwood

(57) ABSTRACT

A face seal assembly is provided having an annular seal body mounted in an axially moveable relationship to a seal support structure. A piston ring is disposed between the annular seal body and the seal support structure forming a secondary seal. A first locator spring, which is an annular wave spring, is disposed between said seal support structure and the piston ring to urge the piston ring in an axial direction. Optionally, a second locator spring, also a wave spring, may be disposed between the piston ring and the seal support structure for urging the piston ring in a radial direction.

12 Claims, 4 Drawing Sheets

SEAL FOR A ROTATING MEMBER

STATEMENT REGARDING FEDERALLY SPONSORED RESEARCH & DEVELOPMENT

The U.S. Government may have certain rights in this invention pursuant to contract numbers NAS3-98004 and/or NASA-27720 awarded by the National Aeronautics and Space Administration.

BACKGROUND OF THE INVENTION

The present invention relates generally to face seals for rotating machinery, and more particularly to a secondary seal for a face seal assembly.

Face seals are used to minimize leakage through a gap between two components, wherein such leakage is from a higher pressure area to a lower pressure area. Such seals have been used in rotating machinery, for example steam turbines and gas turbines. Face seals minimize the leakage of steam between a rotor and a stator in steam turbines and minimize the leakage of compressed air or combustion gases between a rotor and a stator in gas turbines.

Axial seals which have a moveable element, including face seals and aspirating seals, require a sliding secondary seal. This secondary seal must be capable of handling the same pressure ratio as the primary seal and must have minimal leakage. The secondary seal functions between two parts, one stationary and one which slides axially. The secondary seal is dry (non-lubricated) and must have low internal friction. In a gas turbine engine application, the secondary seal is also exposed to a severe operating environment, including a severe thermal environment and dust. The secondary seal must be capable of sealing between two parts while they deflect radially at different rates due to the surrounding hot gases with varying heat transfer coefficients. Prior art secondary seals typically use a plurality of arcuate segments or a piston ring as the secondary seal element, with multiple coil springs positioning the sealing element. This results in an unnecessarily high number of parts. Furthermore, at high gas velocities, dust can erode away the material of interrupted parts like coil springs which could result in seal failure.

Accordingly, there is a need for a face seal assembly having a secondary seal with a simple construction.

BRIEF SUMMARY OF THE INVENTION

The above-mentioned need is met by the present invention, which provides a face seal assembly having an annular seal body mounted in an axially moveable relationship to a seal support structure. A piston ring is disposed between the annular seal body and the seal support structure forming a secondary seal. A first locator spring, which is an annular wave spring, is disposed between said seal support structure and the piston ring to urge the piston ring in an axial direction. Optionally, a second locator spring, also a wave spring, may be disposed between the piston ring and the seal support structure for urging the piston ring in a radial direction.

The present invention and its advantages over the prior art will become apparent upon reading the following detailed description and the appended claims with reference to the accompanying drawings.

BRIEF DESCRIPTION OF THE DRAWINGS

The subject matter that is regarded as the invention is particularly pointed out and distinctly claimed in the concluding part of the specification. The invention, however, may be best understood by reference to the following description taken in conjunction with the accompanying drawing figures in which:

DETAILED DESCRIPTION OF THE INVENTION

Figure 1:
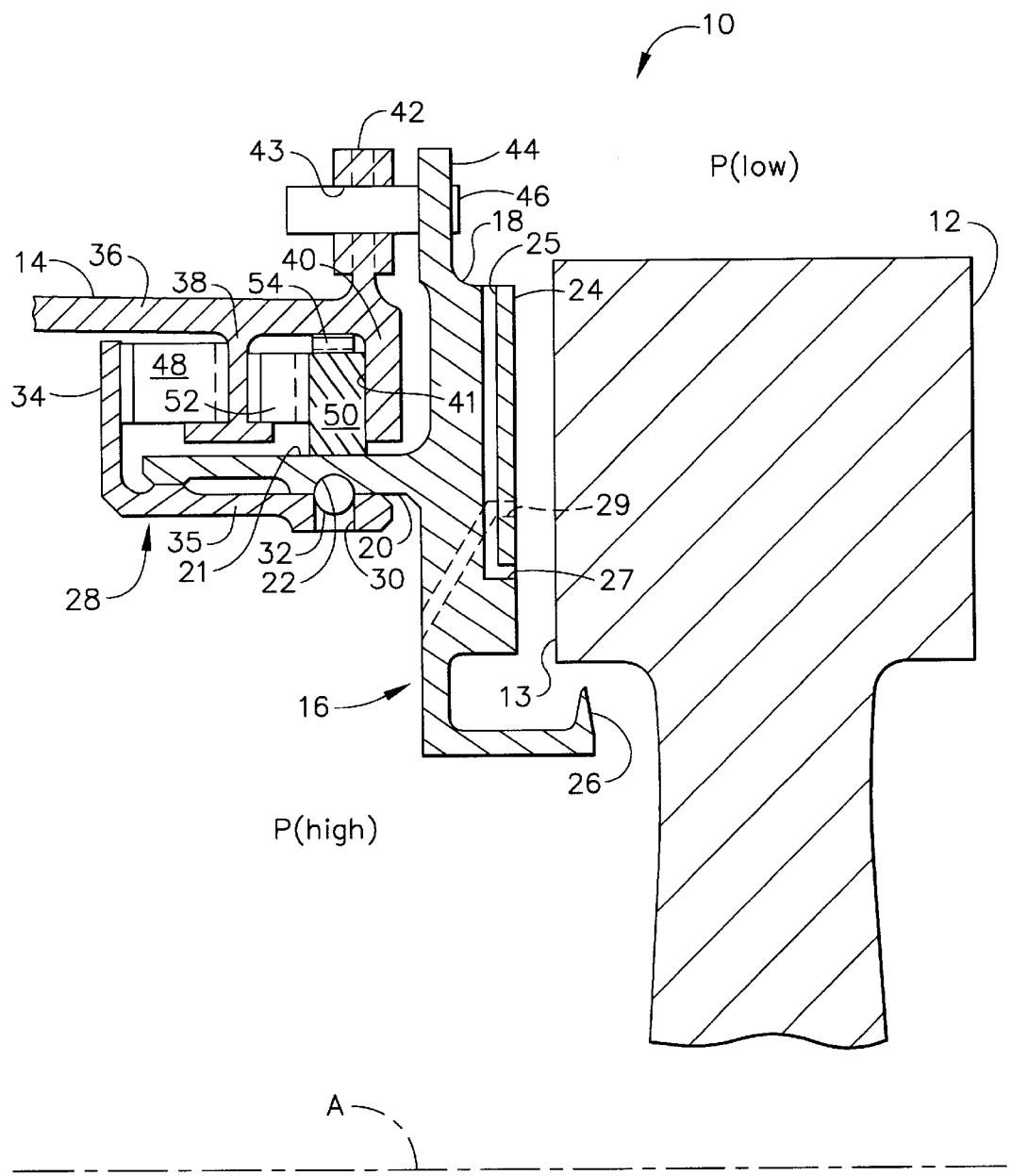
FIG. 1 is a fragmentary cross-sectional view of an exemplary seal assembly constructed in accordance with the present invention.

Referring to the drawings wherein identical reference numerals denote the same elements throughout the various views, FIG. 1 shows an exemplary seal assembly 10 which seals leakage between an area of relatively high pressure P(high) and an area of relatively low pressure P(low), such as a sump area and a flowpath of a gas turbine engine. The basic components of the seal assembly 10 are a rotor 12, a stationary seal support assembly 14, and a seal body 16, all disposed about a longitudinal axis, marked A in FIG. 1. The rotor 12, for example a turbine rotor, is generally disk-shaped and defines a first axially facing primary seal surface 13.

The seal support structure 14 is a nonrotating component and includes an annular, generally cylindrical portion 36. A first circumferential flange 40 extends radially inwardly from a first end of the cylindrical portion 36. The first flange 40 defines an axially facing secondary sealing surface 41. A second circumferential flange 38 extends radially inwardly from the cylindrical portion 36 and is axially spaced away from the first flange 40. A third flange 42 extends radially outwardly from the first end of the cylindrical portion 36. This third flange 42 has one or more holes 43 formed therethrough for the purpose of accepting axial locator pins, described below.

A seal body 16 is mounted to the seal support structure 14. The seal body 16 is an annular component and has a generally T-shaped crosssection as shown in FIG. 1. The seal body 16 comprises a radially extending portion 18 and an axially extending portion 20. The radially extending portion 20 defines an axially facing second primary sealing surface 24. This second primary sealing surface 24 is disposed in close proximity to the rotor 12 and faces the first primary sealing surface 13. A circumferential seal tooth 26, commonly referred to as a "starter seal", extends from the inner end of the radially extending portion 18. Fluid passages 25, 27, 29 may be formed through the radially extending portion 18 in a known manner as required for hydrostatic balancing of the seal body 16 in operation (described in more detail below). An outer flange 44 extends radially outwardly from the radially extending portion 18. One or more locator pins 46 are attached to the outer flange 44 and extend in an axial direction. The locator pins 46 are received in the holes 43 of the third flange 42 of the seal support structure 14. The arrangement of the locator pins 46 within the holes 43 allows the seal body 16 to move axially with respect to the seal support structure 14 while restraining the seal body 16 in the radial and circumferential directions. The axially extending portion 20 also defines a radially facing secondary extending surface 21.

A seal body extension 28 is attached to the axially extending portion 20 of the seal body 16. The seal body extension 28 is generally L-shaped in cross-section, having a generally cylindrical portion 35 and a disk-shaped portion defining a annular flange 34. The cylindrical portion 35 fits snugly against the inside diameter of the axially extending portion 20 of the seal body 16. The seal extension 28 is retained to the seal body 16 by a circumferential lock wire 32 which fits into grooves 22 and 30 formed in the axially extending portion 20 of the seal body 16 and the seal body extension 28, respectively.

Figure 2:
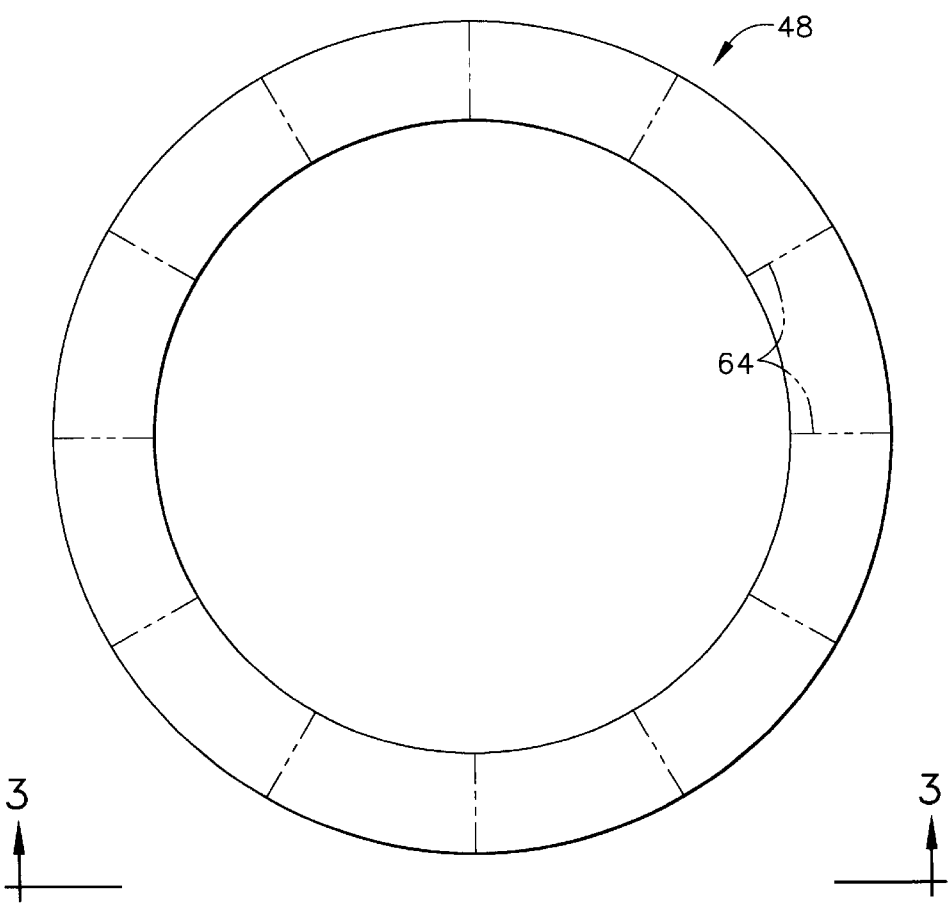
FIG. 2 is a front view of a exemplary axial wave spring for use with the present invention.
Figure 3:
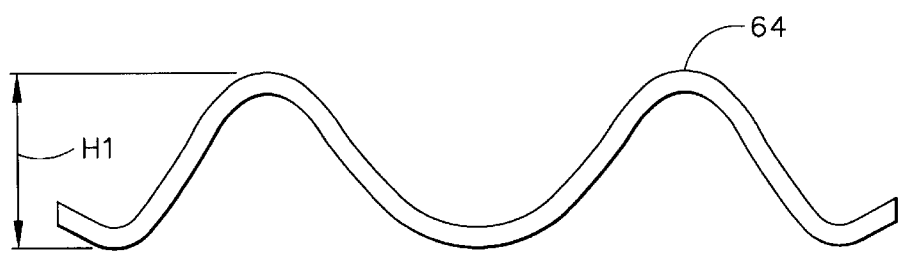
FIG. 3 is a view taken along lines 3–3 of FIG. 2.

A pullback spring 48 is disposed between the flange 34 of the seal body extension 28 and the second flange 38 of the seal support structure 14. The pullback spring 48 serves to displace the seal body 16 away from the rotor 12. This function is described in more detail below. As shown in FIGS. 2 and 3, the pullback spring 48 is an annular spring of the type referred to as a wave spring and comprises a series of alternating corrugations 64. The peak-to-valley height H1 of the corrugations 64, measured in the axial direction, is selected such that when the pullback spring 48 is installed it will urge the seal body extension 28 and the attached seal body 16 axially away from the rotor 12. Use of a wave spring for this function has benefits over the plurality of coil springs used in prior art seal assemblies, because the number of parts in the seal assembly 10 is reduced, reducing complexity and simplifying assembly. Furthermore, use of a wave spring avoids the thin wire elements of coil springs which are subject to erosion.

A secondary seal in the form of a piston ring 50 is disposed in the annular space between two flanges 38 and 40, and seals against the axially facing secondary sealing surface 41 of the first flange 40 and the radially facing secondary sealing surface 21 of the axial portion 20 of the seal body 16. The purpose of the piston ring 50 is to prevent leakage through a path between the seal body 16 and the seal support structure 14, which is subject to the same pressure differential as the primary seal, while allowing axial movement of the seal body 16.

Figure 4:
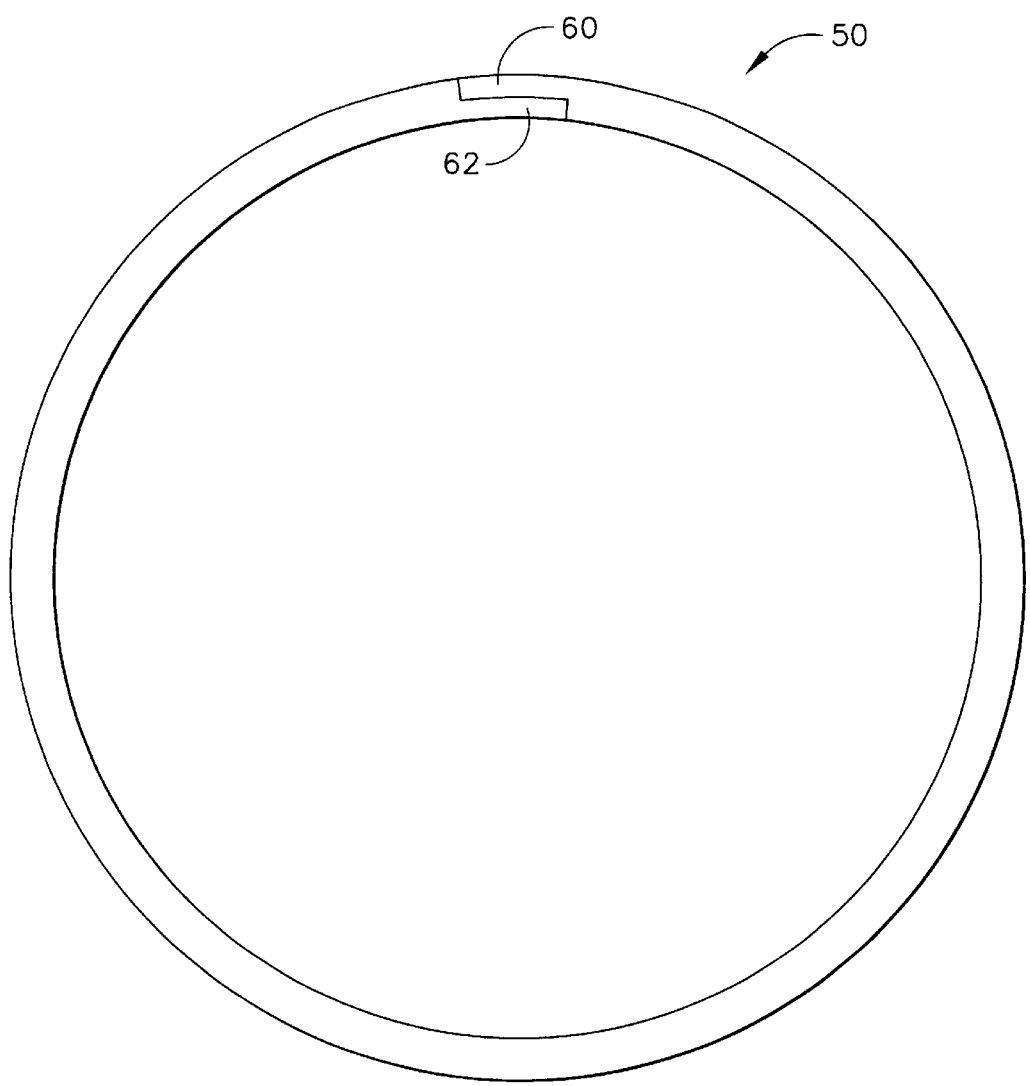
FIG. 4 is a front view of an exemplary piston ring for use with the present invention.

The piston ring 50 is illustrated in more detail in FIG. 4. The piston ring 50 is of a known type which provides a continuous (or nearly continuous) circumferential seal. The piston ring 50 is split at one circumferential location, and is expanded slightly upon installation so that it provides a radially inward spring tension. The piston ring 50 may include known features which serve to reduce leakage between the ring ends, such as overlapping end tabs 60 and 62. Other known variations of the ring structure, such as different types of end arrangements, multi-part or "gapless" rings, or tandem rings (not shown) could also be used.

A first locator spring 52 is disposed in the annular space between the second inner flange 38 and the piston ring 50. The first locator spring is an annular wave spring and its structure is similar to that of the pullback spring 48, comprising a plurality of alternating corrugations. The peak-to-valley height of the corrugations (in the free condition), measured in the axial direction, is less than the axial length of the space into which the first locator spring 52 is installed. Accordingly, when the first locator spring 52 is installed it will urge the piston ring 50 in an axial direction against the axially facing secondary sealing surface 41 of the seal support structure 14.

The dimensions of the piston ring 50 may be selected so that its spring tension holds it in sealing contact against radially facing sealing surface 21 of the seal body 16 under operating conditions. Optionally, it may be urged into position against the radially facing secondary sealing surface 21 by a second locator spring 54 disposed in the annular space between the piston ring 50 and the seal support structure 14.

Figure 6:
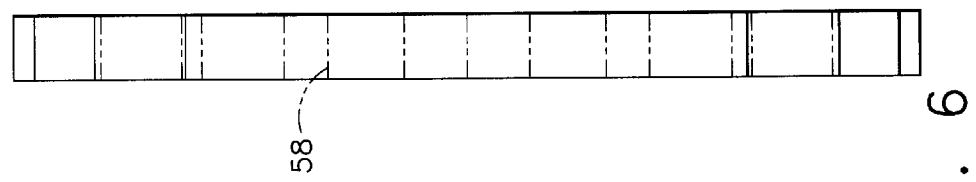
FIG. 6 is a view taken along lines 6–6 of FIG. 5.
Figure 5:
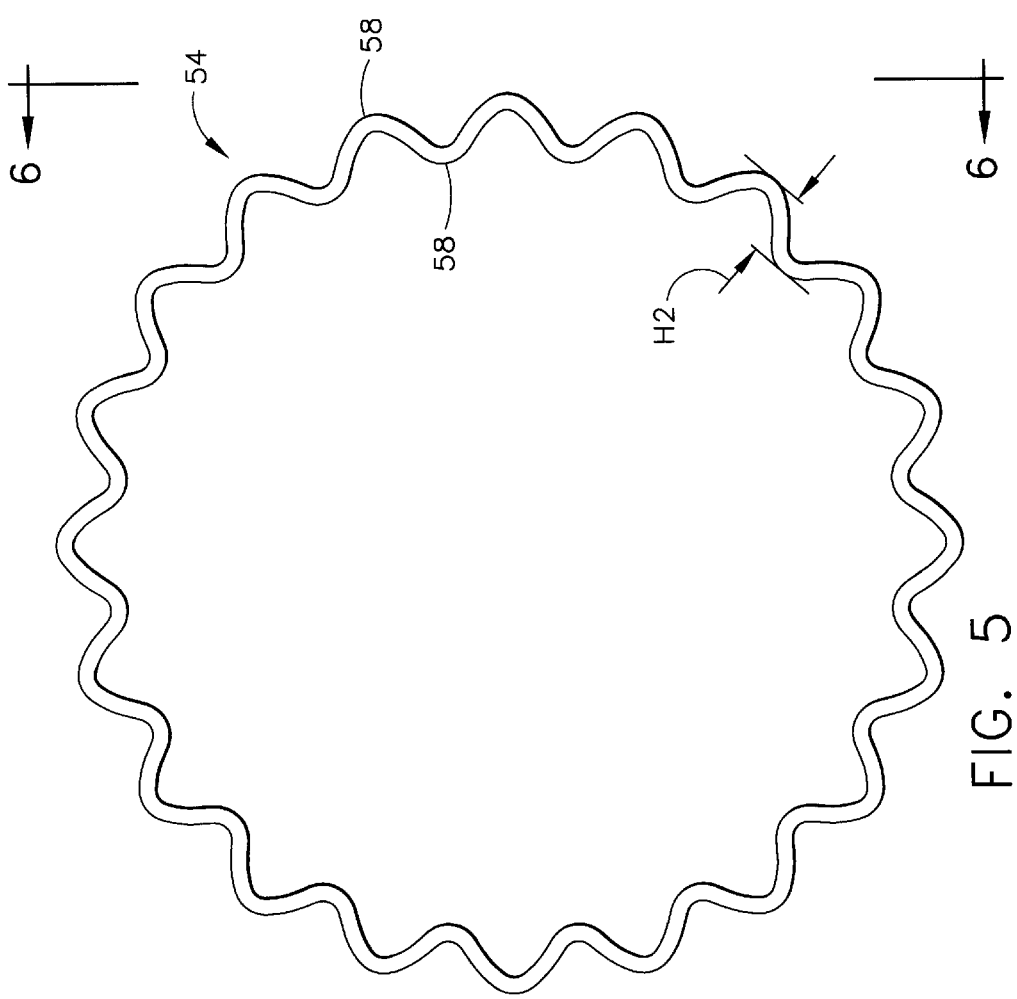
FIG. 5 is a front view of a radial wave spring for use with the present invention.

An exemplary second locator spring 54 is shown in more detail in FIGS. 5 and 6. The second locator spring 54 is intended to apply a radially directed force against the adjacent components. As seen in the drawing, the second locator spring 54 is an annular wave spring and comprises a series of alternating corrugations 58. The peak-to-valley height H2 (in the free condition) of the corrugations 58, measured in the radial direction, is less than the radial height of the annular space outside of the piston ring 50 into which the wave spring 54 is installed. Accordingly, when the second locator spring 54 is installed it will urge the piston ring 50 radially inward so as to seal against the radially facing secondary sealing surface 21 of the seal body 16.

In operation, the seal body 16 forms a seal in cooperation with the rotor 12. The pullback spring 48 holds the seal body 16 away from the rotor 12 to prevent contact between the two components when the engine is stopped or is operating at idle speed. As the engine operating speed increases, the fluid pressures in the engine's flowpath and sump areas increase, and accordingly the seal assembly 10 is subjected to increasing pressures acting on its axially facing surfaces, the effect of which is to cause the seal body 16 to move towards the rotor 12. By choosing the relative surface areas of the different portions of the seal body 16, the number and dimensions of passages 25, 27, and 29, and the dimensions of the pullback spring 48 in a known manner, the seal assembly 10 is hydrostatically pressure balanced at a selected operating condition. Accordingly, the second primary sealing surface 24 never contacts the first primary sealing surface 13, but operates with a small clearance, for example about 0.03–0.05 mm (0.001–0.002 in.) The low operating clearance of the aspirating seal assembly minimizes leakage. In order to permit the necessary axial movement of the seal body 16 without excessive leakage, the piston ring 50 seals against both the seal support structure 14, at axially facing secondary sealing surface 41, and the seal body 16, at the radially facing secondary sealing surface 21, urged into position by the first locator spring 52, and optionally, the second locator spring 54.

Although the secondary seal of the present invention has been described with respect to an non-contact aspirating face seal, the piston ring and locator spring arrangement may be also used with other types of seal assemblies which have a similar structure to the exemplary embodiment described herein and which require a secondary seal, for example rubbing contact face seals.

The foregoing has described a face seal assembly having an annular seal body mounted in an axially moveable relationship to a seal support structure. A piston ring is disposed between the annular seal body and the seal support structure forming a secondary seal. A first locator spring, which is an annular wave spring, is disposed between said seal support structure and the piston ring to urge the piston ring in an axial direction. Optionally, a second locator spring, also a wave spring, may be disposed between the piston ring and the seal support structure for urging the piston ring in a radial direction. While specific embodiments of the present invention have been described, it will be apparent to those skilled in the art that various modifications thereto can be made without departing from the spirit and scope of the invention as defined in the appended claims.

What is claimed is:

1. A seal assembly, comprising:
   a first annular component defining an axially facing first primary sealing surface;

a second annular component defining an axially facing second primary sealing surface, said second annular component being mounted in an axially moveable relationship to a seal support structure such that said second primary sealing surface is disposed facing said first primary sealing surface, a piston ring disposed in sealing contact with said seal support structure and said second annular component;

a first locator spring disposed between said seal support structure and said piston ring for urging said piston ring in an axial direction, said first locator spring being an annular wave spring; and a second locator spring disposed between said stationary structure and said piston ring for urging said piston ring in a radially inward direction, said second locator spring being an annular wave spring.

2. The seal assembly of claim 1 wherein said seal support structure includes a circumferential flange defining an axially facing secondary sealing surface, and said first locator spring urges said piston ring into sealing contact with said axially facing sealing surface.

3. The seal assembly of claim 1 wherein said second annular component includes an axially extending portion defining a radially facing secondary sealing surface, and said second locator spring urges said piston ring into sealing contact with said radially facing secondary sealing surface.

4. A seal assembly disposed about an axis, comprising:

a first annular component defining an axially facing first primary sealing surface;

a second annular component defining an axially facing second primary sealing surface, said second annular component being mounted in an axially moveable relationship to a seal support structure such that said second primary sealing surface faces said first primary sealing surface, a piston ring disposed between said second annular component and said seal support structure forming a secondary seal;

a pullback spring disposed between said second annular component and said seal support structure for urging said second annular component away from said first annular component, said pullback spring being an annular wave spring;

a first locator spring disposed between said seal support structure and said piston ring for urging said piston ring in an axial direction, said first locator spring being an annular wave spring.

5. The seal assembly of claim 4 wherein said seal support structure includes a circumferential flange defining an axially facing secondary sealing surface, and said first locator spring urges said piston ring into sealing contact with said axially facing sealing surface.

6. The seal assembly of claim 4 further comprising a second locator spring disposed between said stationary structure and said piston ring for urging said piston ring in a radially inward direction, said second locator spring being an annular wave spring.

7. The seal assembly of claim 6 wherein said second annular component includes an axially extending portion defining a radially facing secondary sealing surface, and said second locator spring urges said piston ring into sealing contact with said radially facing secondary sealing surface.

8. A seal assembly disposed about an axis for a gas turbine engine, comprising:

a rotor having an axially facing first primary sealing surface;

a stationary seal support structure disposed adjacent said rotor;

an annular seal body attached to said seal support structure and disposed between said rotor and said seal support structure, said seat body being axially movable with respect to said seal support structure, said annular seal body including a generally radially extending portion which defines an axially facing second primary sealing surface which faces said first primary sealing surface, and a generally axially extending portion which defines a radially facing secondary sealing surface;

an annular piston ring disposed around said axially extending portion of said seal body;

a first locator spring disposed between said piston ring and said seal support structure so as to urge said piston ring axially into sealing contact with said seal support structure, said first locator spring being an annular wave spring; and a second locator spring disposed between said piston ring and said seal support structure so as to urge said piston ring radially inward against said radially facing secondary sealing surface, said second locator spring being an annular wave spring.

9. The seal assembly of claim 8 wherein said seal support structure includes a first radially extending circumferential flange defining an axially facing secondary sealing surface.

10. The seal assembly of claim 9 wherein said seal support assembly includes a second radially extending circumferential flange disposed in axially spaced apart relationship to said first circumferential flange, and said first locator spring is disposed between said first and second circumferential flanges.

11. The seal assembly of claim 8 further comprising a pullback spring disposed between said seal body and said seal support structure so as to urge said seal body away from said rotor, said pullback spring being an annular wave spring.

12. The seal of claim 11 further comprising a seal body extension attached to said seal body, said seal body extension including a radially extending annular flange and a cylindrical portion, wherein said pullback spring is disposed between said annular flange of said seal body extension and said second circumferential flange of said seal support structure.

* * * * *